Feb. 24, 1925.
E. A. ROLLINS
PUMP
Filed July 13, 1921
1,527,226
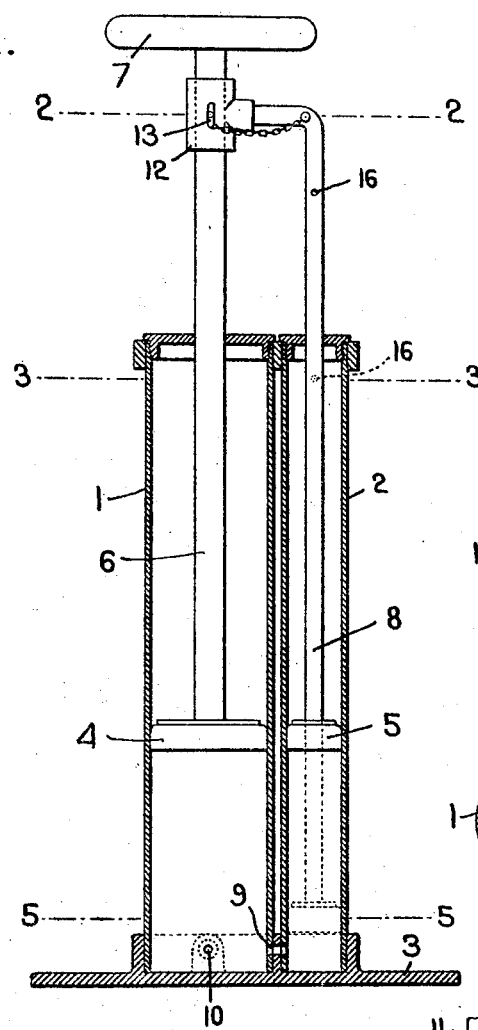
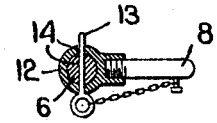
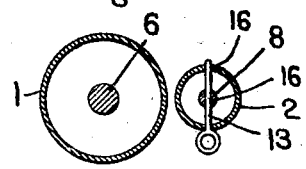
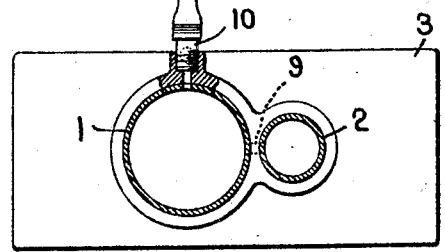
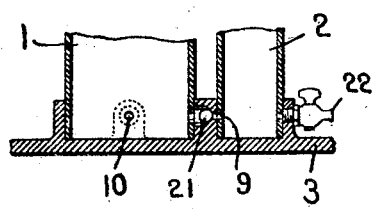
Inventor.
Edward A. Rollins
by Heard Smith & Tennant.
Attys.

Patented Feb. 24, 1925.

1,527,226

UNITED STATES PATENT OFFICE.

EDWARD A. ROLLINS, OF ROXBURY, MASSACHUSETTS.

PUMP.

Application filed July 13, 1921. Serial No. 484,360.

*To all whom it may concern:*

Be it known that I, EDWARD A. ROLLINS, a citizen of the United States, and resident of Roxbury, county of Suffolk, State of Massachusetts, have invented an Improvement in Pumps, of which the following description, in connection with the accompanying drawing, is a specification, like characters on the drawing representing like parts.

This invention relates to hand tire pumps such as are used for pumping up automobile tires and it has for its object to provide a novel form of pump which is constructed to deliver a large volume of air while the pressure in the tire is low and while it is easily pumped, and to deliver a smaller volume of air at each stroke when the pressure in the tire is nearing the maximum and when the pumping is a more difficult operation.

I accomplish this object by providing a novel hand pump which may be arranged to have either a large piston area or a small piston area, the large piston area being used while the pressure is low and until the pressure in the tire arrives at a point at which it is difficult to operate the pump and the small piston area being used when the pressure in the tire is relatively high.

With this arrangement the tire can be pumped up rapidly while the pressure is low and when the labor involved becomes greater than the operator desires, he may then switch to the low piston area thus making it easier to operate the pump against the high pressure in the tire.

A pump embodying my invention comprises two separate cylinders fixed with relation to each other preferably arranged side by side and either of the same or of different diameters, a piston in each cylinder and means for coupling the piston rods together, whereby the pistons work in unison or for disconnecting the piston rods so that one piston only may be used.

In order to give an understanding of the invention I have illustrated in the drawings a selected embodiment thereof which will now be described after which the novel features will be pointed out in the appended claims.

Fig. 1 is a vertical section through a pump embodying my invention.

Fig. 2 is a section on the line 2—2, Fig. 1.

Fig. 3 is a section on the line 3—3, Fig. 1.

Fig. 4 is a fragmentary view showing a modification of the invention.

In the drawings the two cylinders of the pump are indicated at 1 and 2 respectively, said cylinders being mounted upon a suitable base 3 which provides a foot piece by which the pump may be retained in position during the pumping operation. Operating in each cylinder is a piston of any suitable construction, said pistons being indicated at 4 and 5 respectively. The piston 4 has a piston rod 6 extending therefrom through the head of the cylinder 1 and to which is connected a handle 7. The piston 5 has a piston rod 8 connected thereto extending through the head of the cylinder 2. The two cylinders communicate with each other at their lower ends as shown at 9 and one or both of the cylinders is provided with a discharge connection 10 to which a discharge pipe 11 is secured that leads to the tire or other article to be pumped up, said discharge connection having the usual check valve.

Means are provided for whereby both pistons may be operated simultaneously to pump air through the discharge hose 11 or one piston may be rendered inoperative and the other piston only used depending on the pressure against which the pump is operating and the strength of the operator. When both pistons are connected together so as to operate simultaneously the effect will be that of a pump having a piston area equal to the combined area of the pistons 4 and 5, and when operating in this way a relatively large volume of air will be delivered at each stroke. When the piston rods are disconnected and one piston is rendered inoperative then the effect will be that of a pump having a piston area equal to that of the operative piston only and the pump will deliver a smaller volume of air at each stroke but can be operated easier against high pressure.

Various ways may be employed for coupling pistons together so that they operate simultaneously or rendering one of the pistons inoperative. In the construction herein shown the piston rod 8 for the piston 5 is connected to a sleeve 12 which is slidably mounted on the piston rod 6 and which may be locked to the piston rod by some suitable means such for instance as a pin 13 adapted to extend through holes 14 in the sleeve and piston rod 6 respectively. When the piston rods are thus coupled together the two pistons will operate together as above specified.

When the pin 13 is removed then the piston rods are disconnected from each other and the piston 4 will operate by itself and independently of the piston 5. In order to prevent the piston 5 from interfering with the piston 4 when the two pistons are disconnected I have herein shown means for locking the piston 5 in its lowered position and this is provided for by making the cylinder 2 and piston rod 8 with holes 16 which are in alignment when the piston 5 is at the lower end of its stroke and into which the pin 13 may be inserted to lock the piston 5 from movement. When this condition exists the piston 4 may be operated independently and the pump will operate as a single cylinder pump.

In lieu of this manner of making the piston 5 inoperative I may employ a check valve 21 in the connection 9 which will accomplish the same purpose as shown in Fig. 4.

Or, if desired, I may provide the cylinder 2 with a vent valve 22, which when opened, will render said cylinder inoperative. When this vent is used it will not be necessary to uncouple the piston rods when it is desired to utilize one cylinder only, because when the vent is open the piston 5 will simply act idly and the check valve 21 will prevent the air in the cylinder 1 from passing into the cylinder 2.

In using the pump to pump up a tire the operator will connect the two piston rods together and will then connect the pump to the tire. As the pumping proceeds the tire will be rapidly pumped up because of the fact that at each stroke a relatively large volume of air is delivered to the tire, the air volume being that corresponding to both the cylinders 1 and 2.

When the pressure in the tire reaches that point at which it seems difficult for the operator to actuate the pump, then he may render one of the pistons inoperative either by disconnecting the piston rod 8 from the piston rod 6 or by opening the vent 22. After one of the pistons has thus been rendered inoperative then the subsequent pumping operation will be done by one piston only and although this single piston will deliver a less volume of air at each stroke than the two pistons combined yet it will be easier to operate against higher pressure in the tire.

While I have illustrated some selected embodiments of my invention I do not wish to be limited to the constructional features shown.

I claim:

1. A pump comprising two cylinders fixed relative to each other and communicating with each other at one end, of a piston in each cylinder, a piston rod connected to each piston, a handle for operating one piston rod, and means for coupling the other piston rod to the first-named piston rod or disconnecting it therefrom, and means for locking said other piston rod from movement when disconnected from the first-named piston rod.

2. In a pump, the combination with two cylinders arranged in parallelism and having a fixed relation relative to each other, of a piston in each cylinder, a piston rod connected to each piston, a handle for operating one piston rod, a sleeve connected to the other piston rod and through which the first-named piston rod extends, and means for detachably coupling said sleeve to said first-named piston rod.

3. In a pump, the combination with two cylinders arranged in parallelism and having a fixed relation relative to each other, of a piston in each cylinder, a piston rod connected to each piston, a handle for operating one piston rod, a sleeve connected to the other piston rod and through which the first-named piston rod extends, and means for detachably coupling said sleeve to said first-named piston rod, and means to lock said other piston rod from movement when said sleeve is disconnected from the first-named piston rod.

4. A pump comprising two cylinders fixed relative to each other and communicating directly with each other at one end, one of said cylinders having a discharge port through which both cylinders discharge, a piston in each cylinder, a piston rod connected to each piston, a handle permanently connected to the piston rod of the piston operating in the cylinder having the discharge port, means for detachably coupling the other piston rod to the first-named piston rod or disconnecting it therefrom, and means for locking said other piston rod from movement when it is disconnected from the first-named piston rod.

In testimony whereof, I have signed my name to this specification.

EDWARD A. ROLLINS.